(12) United States Patent
Tortora et al.

(10) Patent No.: US 11,874,632 B2
(45) Date of Patent: Jan. 16, 2024

(54) OPTICAL DEVICE ALLOWING TO CREATE OPTICAL AESTHETIC AND TECHNICAL EFFECTS

(71) Applicant: Blancpain SA, Le Brassus (CH)

(72) Inventors: Pierpasquale Tortora, Neuchatel (CH); Cédric Blatter, Commugny (CH); Nicolas Debaud, Blonay (CH); Bernat Monferrer, St-Prex (CH)

(73) Assignee: Blancpain SA, Le Brassus (CH)

( * ) Notice: Subject to any disclaimer, the term of this patent is extended or adjusted under 35 U.S.C. 154(b) by 664 days.

(21) Appl. No.: 17/065,012

(22) Filed: Oct. 7, 2020

(65) Prior Publication Data

US 2021/0191332 A1 Jun. 24, 2021

(30) Foreign Application Priority Data

Dec. 23, 2019 (EP) .................................... 19219492

(51) Int. Cl.
*G04B 19/26* (2006.01)
*G02B 3/00* (2006.01)
*G02B 26/02* (2006.01)
*G04B 13/02* (2006.01)

(52) U.S. Cl.
CPC .............. *G04B 19/268* (2013.01); *G02B 3/00* (2013.01); *G02B 26/02* (2013.01); *G04B 13/02* (2013.01); *G02B 2003/0093* (2013.01)

(58) Field of Classification Search
CPC ........ G04B 19/268; G04B 13/02; G02B 3/00; G02B 26/02; G02B 2003/0093
See application file for complete search history.

(56) References Cited

U.S. PATENT DOCUMENTS 6,885,614 B2 * 4/2005 Rey-Mermet ........ G04B 19/268
434/284
9,726,824 B1 * 8/2017 Berger ..................... G02B 6/32
(Continued)

FOREIGN PATENT DOCUMENTS

CN 2443401 Y 8/2001
CN 1326553 A 12/2001
(Continued)

OTHER PUBLICATIONS

Russian Office Action dated May 19, 2021 in Russian Patent Application No. 2020140601/05(075581) (with English language translation), citing documents AO-AS therein, 8 pages.
(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

An optical device including a transparent support provided with an upper face and a lower face which extends at a distance from the upper face, the transparent support forming a lens of plano-concave shape delimited on a first side by a planar surface, and delimited on a second side, opposite the first side, by a concave surface, the optical device also including a shutter which is disposed under the concave surface of the transparent support, at a distance therefrom, the optical device finally including a substrate disposed after the shutter.

32 Claims, 8 Drawing Sheets

(56) References Cited

U.S. PATENT DOCUMENTS

| | | | | |
|---|---|---|---|---|
| 2012/0287508 A1* | 11/2012 | Muneyoshi | ............ | G02B 26/02 |
| | | | | 359/601 |
| 2015/0185397 A1* | 7/2015 | Klement | ................ | G02B 6/005 |
| | | | | 345/82 |
| 2016/0018635 A1 | 1/2016 | Adachi | | |

FOREIGN PATENT DOCUMENTS

| | | |
|---|---|---|
| CN | 202306158 U | 7/2012 |
| CN | 203595903 U | 5/2014 |
| CN | 206788560 U | 12/2017 |
| CN | 108628145 A | 10/2018 |
| EP | 2 392 976 A2 | 12/2011 |
| FR | 3 064 376 A1 | 9/2018 |
| RU | 1788512 A1 | 1/1993 |
| RU | 146 127 U1 | 9/2014 |
| WO | WO 91/11756 A1 | 8/1991 |
| WO | WO-2005054962 A1 * | 6/2005 ........... G04B 19/268 |
| WO | WO 2014/152925 A1 | 9/2014 |
| WO | WO-2014152925 A1 * | 9/2014 ............... B81B 7/02 |

OTHER PUBLICATIONS

Combined Chinese Office Action and Search Report dated Nov. 29, 2021 in Chinese Patent Application No. 202011536486.2 (with English translation of Categories of Cited Documents), citing documents AO-AS therein, 8 pages European Search Report dated Jun. 5, 2020 in European Application 19219492.6 filed Dec. 23, 2019 (with Engiish Translation of Categories of Cited Documents), citing documents AA-AB, AO-AP & AX therein, 3 pages.

Glaser., "Astronomische Indikationen Bei Uhren", Jahrbuch Der Deutschen Gesellschaft Fur Chronometrie, Deutschen Gesettschaft Fur Chronometrie E.V. vol. 40, Jan. 1, 1989, 23 pages.

\* cited by examiner

OPTICAL DEVICE ALLOWING TO CREATE OPTICAL AESTHETIC AND TECHNICAL EFFECTS

CROSS-REFERENCE TO RELATED APPLICATION

This application claims priority to European Patent Application No. 19219492.6 filed on Dec. 23, 2019, the entire disclosure of which is hereby incorporated herein by reference.

TECHNICAL FIELD OF THE INVENTION

The present invention relates to an optical device allowing to create new visual effects and which is suitable for both aesthetic and technical applications.

TECHNOLOGICAL BACKGROUND OF THE INVENTION

Conceived by the Scottish physicist Brewster at the beginning of the 19th century, the kaleidoscope is an optical instrument that reflects infinitely and in colour the external light which propagates inside this optical instrument by reflection on mirrors. The name of this optical instrument was constructed using the Greek words kalos which means "beautiful", eidos which means "image" and skopein which means "to look". In the form of a tube into a first end of which light penetrates and into a second end of which the observer looks, the kaleidoscope contains a number of coloured glass fragments which, when shaken, reorganise themselves according to almost unlimited number of combinations and produce beautiful changing images. As will be understood upon reading the following, a kaleidoscope is an example of a device to which the present invention may be applied.

Another example of a device to which the present invention can be applied is given by the moon phase display mechanisms which have long been used in timepieces, in particular wristwatches. The purpose of these moon phase display mechanisms is to let watch owners know when in the lunar cycle they are. These moon phase display mechanisms are, however, more decorative than they provide a precise indication allowing the owner of the watch to easily determine which quarter of the moon it is in. The simplest moon phase display mechanisms comprise a hand indicator that points to the various representations of the phases of the moon (first quarter, full moon, last quarter, new moon). Other known moon phase display mechanisms comprise a disc which carries two representations of the Moon, part of this disc being visible through an opening of adapted shape made in the dial of the watch and successively revealing a waxing moon, a full moon, a waning moon and a new moon. Such a presentation of the various phases of the Moon is very advantageous from an aesthetic point of view; however, the way the moon is represented has only a distant relation to the way the lunar star appears in the sky. Yet another moon phase display mechanism comprises a two-colour sphere that revolves completely on itself with each lunar cycle. Such a moon phase display mechanism allows the face of the moon to be represented realistically. However, because such a moon phase display mechanism uses a sphere to represent the different quarters of the moon, it is thick and occupies a large space, so that it is difficult to be integrated into a horological movement, in particular a wristwatch.

SUMMARY OF THE INVENTION

The present invention has the purpose of overcoming the above-mentioned problems as well as others by providing an optical device allowing to create optical aesthetic and technical effects.

To this end, the present invention relates to an optical device comprising a transparent support provided with an upper face and a lower face which extends at a distance from the upper face, this transparent support forming a lens of plano-concave shape delimited on a first side by a planar surface, and delimited on a second side, opposite the first side, by a concave surface, the optical device also comprising a shutter which is disposed under the concave surface of the transparent support, at a distance therefrom, the optical device finally comprising a substrate disposed after the shutter, the optical device being arranged to project, through the plano-concave lens, the image of an edge of the shutter onto an object disposed above the planar surface of said plano-concave lens.

According to special embodiments of the invention:
  the optical refractive index of the material from which the plano-concave lens is made is comprised between 1.60 and 1.85 and, preferably, equal to or substantially equal to 1.78;
  the plano-concave lens is made of glass or polymer;
  the concave surface of the lens has a curved profile and, preferably but not necessarily, an aspherical profile;
  the shutter has a curved profile and, preferably but not necessarily, a hyperbolic profile;
  a representation of the Moon is transferred to one of the upper or lower faces of the transparent support, drive means, moved by a horological movement, driving the shutter, the shutter and the substrate having display contrasts which are inverted relative to each other, the shutter being displaced from an initial position to a final position for a duration of a lunar cycle, so as to reveal day after day to an observer the aspect of the Moon which changes from the new moon to the first quarter moon, then from the first quarter moon to the full moon, then to the last quarter moon and finally to the new moon, the shutter being returned by the drive means from its final position to its initial position at the end of the lunar cycle;
  the drive means comprise a rectilinear rack with which the shutter is fixedly coupled in translation;
  the drive means comprise a lower wheel and an upper wheel on an axis of rotation of which the lower wheel which meshes with the rectilinear rack is mounted free in rotation;
  the horological movement comprises a motion-work mobile which kinematically drives a cam which performs a complete revolution on itself in an integer number of times a lunar cycle, this cam having a profile that is permanently followed by a first rack, this first rack being provided with a toothed sector by which it meshes with the drive means of the moon phase display mechanism;
  the first rack is provided with a feeler beak by which it permanently follows the cam profile, this profile being shaped as a snail and being provided with at least one substantially rectilinear step so that, shortly before the start of a new lunar cycle, the feeler beak is at the top of the cam profile, then falls along the step, the first rack driving during this movement by its toothed sector a pinion which is kinematically connected to the drive means of the moon phase display mechanism;

a clearance take-up device consisting of the upper wheel which is engaged, on the one hand, with the rectilinear rack, and on the other hand, with an intermediate wheel of an intermediate mobile which also comprises an intermediate pinion, this intermediate pinion meshing with a toothed sector of a second rack which is elastically constrained by the return force of a fourth spring.

Thanks to these features, the present invention provides an optical device which, through the plano-concave lens, allows to project the image of an edge of the shutter onto an object disposed above the planar surface of the plano-concave lens.

The device according to the invention may be of interest in its use in combination with a kaleidoscope. Indeed, the image of the edge of the shutter, optimised when passing through the plano-concave lens, is superimposed on the images of the coloured glass fragments, which allows to vary the contours of these images and to multiply even more the shape combinations of these images.

The present invention is also of great interest in its application to a moon phase display mechanism. To this end, according to a particular embodiment of the invention, a representation of the Moon is transferred to the planar surface of the transparent support, and the shutter is arranged to displace between the transparent support and the substrate, the shutter and the substrate having inverted display contrasts relative to each other, the shutter being displaced from an initial position to a final position for a duration of one lunation, so as to reveal day after day to an observer the aspect of the Moon which changes continuously from the first quarter moon to the full moon, then to the last quarter moon and finally to the new moon, the shutter being returned by the drive means from its final position to its initial position at the end of the lunation. The different aspects of the Moon are thus represented in a manner which is original and easily understood by the user. In particular, the representation of the Moon which is provided by the optical device according to the invention is very close to the real aspect of the Moon in the sky, so that it is much simpler for the user to determine at which period of the lunar cycle the Moon is located. The optical device according to the invention is also thinner than those using a sphere rotating on itself, and therefore easier to integrate into a horological movement, in particular a wristwatch. In addition, regardless of the quarter wherein the Moon is located, its representation is always visible to the owner of the watch. It will also be noted that the optical device according to the invention allows to obtain a representation of the various phases of the realistic Moon, formed by two surfaces of different colours and separated by a terminator, that is to say the curve which separates the illuminated part from the dark part of the Moon, the profile of which is very realistic and very faithful to what the user can see when observing the Moon in the sky. This is in particular the case during the first and the last quarter moon, when the optical distortions are almost zero and when the terminator thus appears perfectly rectilinear.

Thanks to the combined use of a plano-concave, preferably aspherical lens, and of a shutter with a curved profile, preferably but not exhaustively of the hyperbolic type, the observer sees a terminator, that is to say the curve which separates the illuminated part from the dark part of the Moon, the profile of which is very realistic and very faithful to what the user can see when observing the Moon in the sky. Furthermore, the optical device is compact and can thus be housed in a smaller volume such as that of a case of a wristwatch-type timepiece. By way of example, it is considered that for a representation of the Moon of the same diameter, the optical device according to the invention is half the thickness of a moon phase display mechanism using a sphere. Likewise, it is understood that, since the surface which receives the representation of the Moon is planar, the optical device according to the invention does not impede the movement of the displacement of the hands on the surface of the dial.

BRIEF DESCRIPTION OF THE FIGURES

Other features and advantages of the present invention will emerge more clearly from the detailed description which follows of an exemplary embodiment of an optical device according to the invention, this example being given in a purely illustrative and non-limiting manner only in connection with the appended drawing on which.

DETAILED DESCRIPTION OF AN EMBODIMENT OF THE INVENTION

The present invention proceeds from the general inventive idea which consists in providing an optical device which enables an image of an edge of a shutter to be projected onto the image of an object disposed above this optical device. To achieve this purpose, the optical device according to the invention essentially comprises a transparent support forming an optical lens of plano-concave shape delimited on a first side by a planar surface, and delimited on a second side opposite the first one by a concave surface. The optical device also comprises a shutter disposed under the plano-concave lens, on the side of the concave surface, as well as a substrate disposed after the shutter. Preferably, but not necessarily, the shutter is arranged to be able to displace in the space which separates the plano-concave lens from the substrate from a proximal position to a distal position and then to return to its proximal position. The advantage of the optical device according to the invention is to create new optical aesthetic or technical effects by allowing to superimpose the image of the edge of the shutter formed through the plano-concave lens with the image of an object disposed above this plano-concave lens, on the side of the planar surface of the latter.

The optical device according to the invention is of very particular interest in its application to a moon phase display mechanism consisting in transferring a representation of the Moon on either one of the two upper and lower faces of the transparent support which is disposed above and at a distance from the substrate, with the shutter interposed between the transparent support and the substrate. The face of the Moon can be represented in a colour similar to that of the substrate, while the shutter and the substrate have inverted contrasts: if the substrate is bright, then the shutter will be dark and, conversely, if the substrate is dark, the shutter will be bright. Assuming, only as an illustrative example, that the representation of the Moon and the substrate are dark and that the shutter is bright, it is understood that when the shutter is not in the space between the transparent support and the dark substrate, the representation of the Moon which is above the dark substrate is not perceptible to the observer. Then, as the bright shutter penetrates into the space which separates the transparent support and the dark substrate, the representation of the Moon gradually becomes visible to the user. The present invention thus provides a compact optical device which allows the moon phases to be displayed in an original and much more realistic manner than most prior art moon phase display devices allow. Consequently, it is much easier for the observer to understand what period of the lunar cycle he is in. Furthermore, the realism is further increased if, in accordance with a special embodiment of the invention, the transparent support is given a plano-concave profile, preferably but not necessarily an aspherical profile, and such a transparent support is combined with a curved shutter, preferably hyperbolic in profile. Indeed, such a combination allows to obtain a terminator whose profile is very faithful to the one observed in reality as the Moon waxes, becomes full, then wanes and the lunar cycle resumes.

Figure 1:
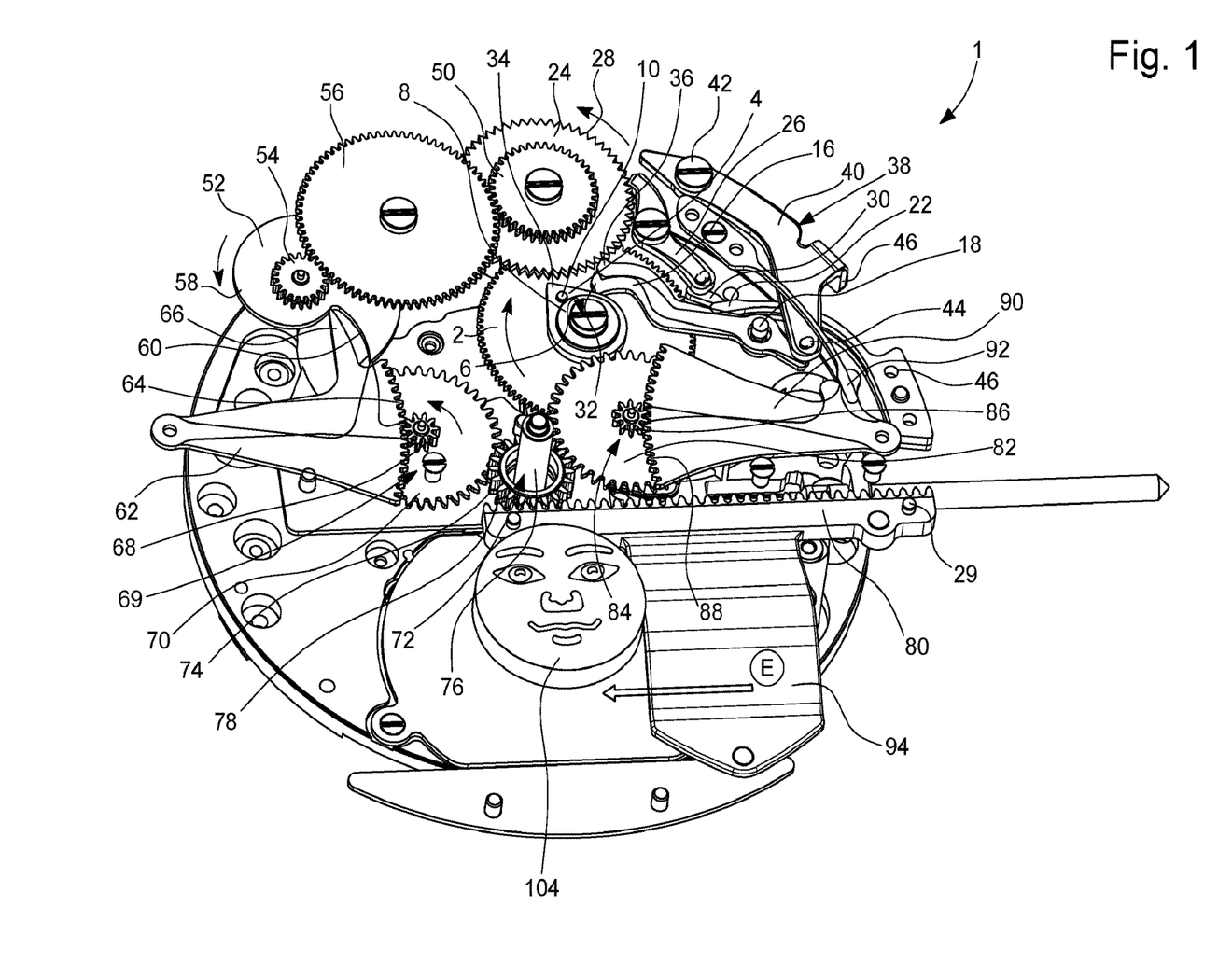
FIG. 1 is a plan view of the moon phase display mechanism which can be combined with the optical device according to the invention.

Housed for example in a timepiece such as a wristwatch, the moon phase display mechanism 1 is driven by a horological movement, that is to say a mechanism whose operation depends on the division of time. More specifically, the horological movement comprises a motion-work mobile, one pinion of which (not visible in the figures) drives a twenty-four-hour wheel 2 which, as its name suggests, is arranged so as to perform one complete revolution by day.

Figure 2:
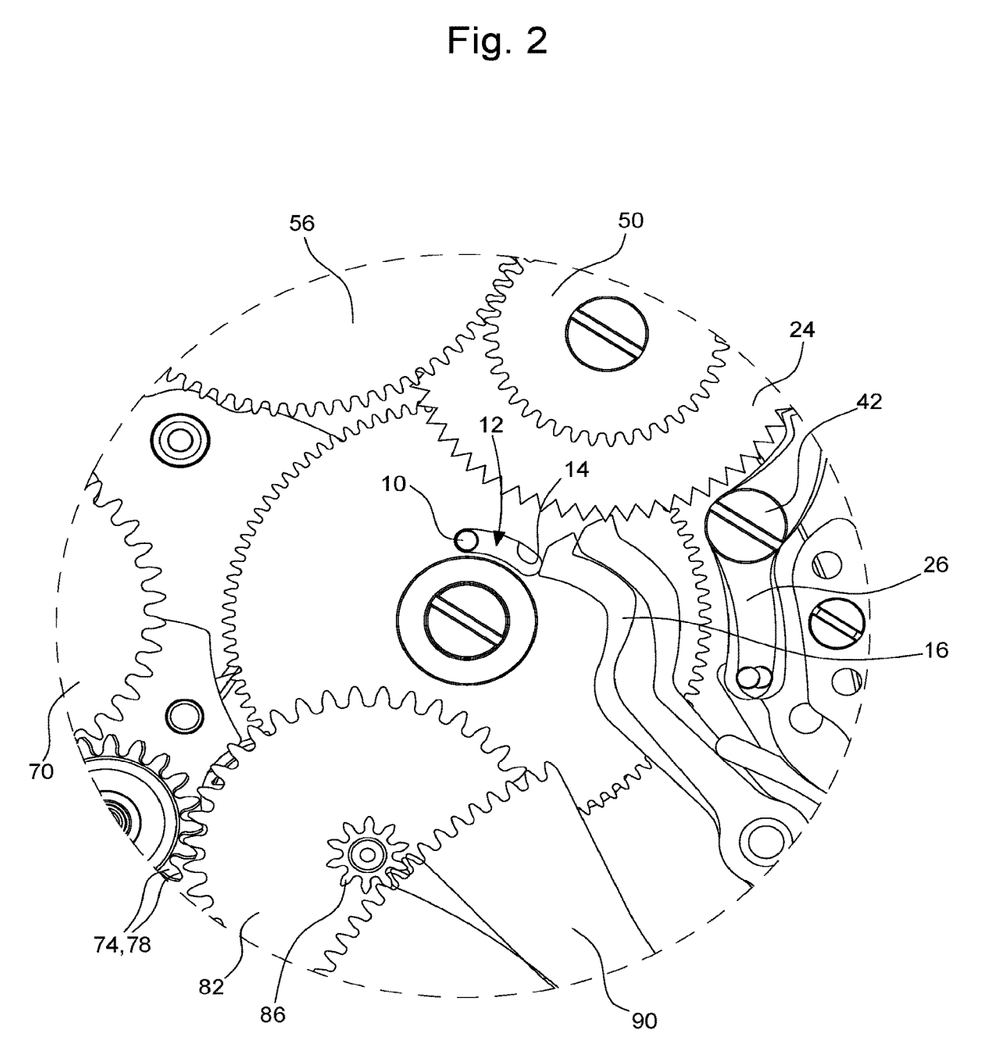
FIG. 2 is a detail view on a larger scale of the oblong hole into which the pin carried by the finger protrudes.

The twenty-four-hour wheel 2 carries a finger 4 on an axis 6 of which this finger 4 is mounted free in rotation. In order to be able to pivot relative to the twenty-four-hour wheel 2, the finger 4 is mounted on the axis 6 with a slight axial play thanks to a ring 8 engaged on this axis 6. Moreover, the finger 4 is provided with a pin 10 which protrudes into an oblong hole 12 formed in the thickness of the twenty-four-hour wheel 2 and which limits the freedom of pivoting of the finger 4 relative to the twenty-four-hour wheel 2 (see FIG. 2). It is therefore understood that when the pin 10 abuts against an inner wall 14 of the oblong hole 12, it is driven in rotation by the twenty-four-hour wheel 2 and in turn drives the finger 4 which, as well, performs a complete revolution in twenty-four-hours.

The moon phase display mechanism 1 also comprises a first lever 16 which is pivotally mounted about a pivot axis 18 and which is elastically applied against a first part 20a of a profile 20 of the finger 4 by an upper spring 22. The presence of a starwheel 24 whose position is indexed by a jumper 26 which is held elastically against a toothing 28 of this starwheel 24 by a lower spring 30 is also noted in the drawing.

Figure 3A:
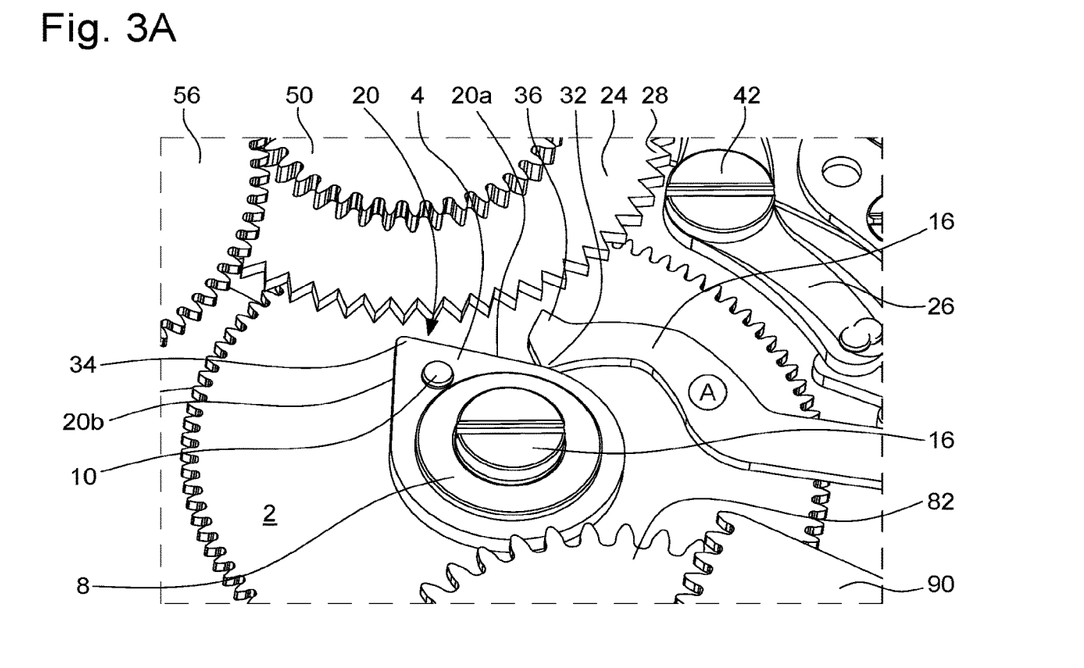
FIG. 3A is a detail view on a larger scale of the first lever in its intermediate position A.
Figure 3B:
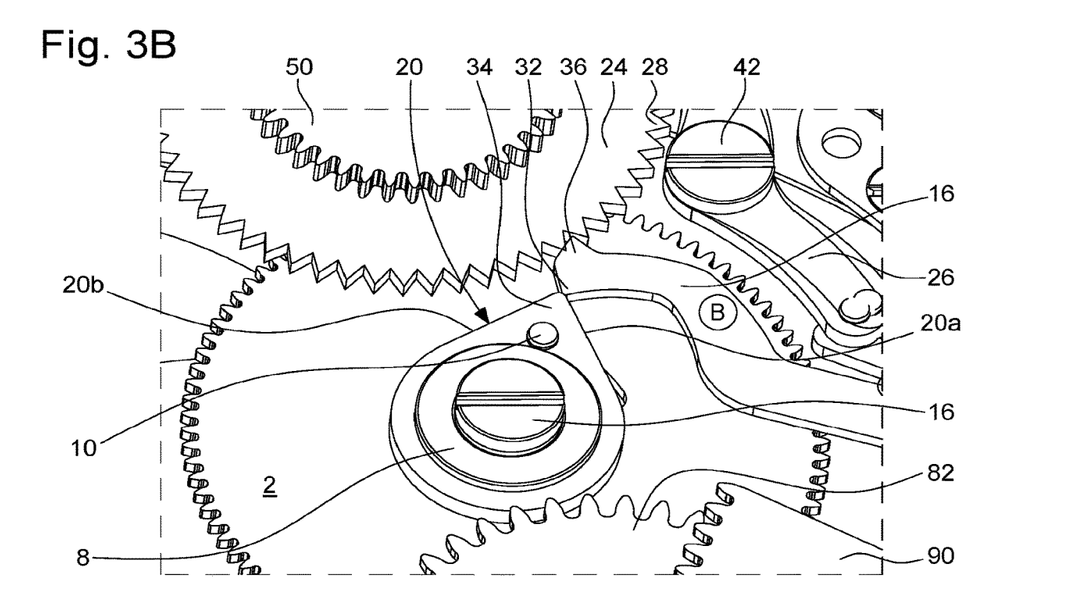
FIG. 3B is a detail view on a larger scale of the first lever in its extreme position B wherein it bears against the top of the finger profile.

The twenty-four-hour wheel 2 rotates in the clockwise direction, bringing with it the finger 4. The first lever 16 thus slides along the first part 20a of the finger 4 profile 20 and, after passing through an intermediate position A (FIG. 3A), is in an extreme position B(FIG. 3B) wherein it is supported by a foot 32 against a top 34 of the finger 4 profile 20. Moreover, the first lever 16 is engaged by a beak 36 with the toothing 28 of the starwheel 24. When, for example around midnight, the finger 4 advances further, the first lever 16 exceeds the extreme position B wherein it is supported against the top 34 of the finger 4 profile 20, and drives the starwheel 24 by one pitch in the counter-clockwise direction. This movement is allowed by the fact that when the first lever 16 exceeds the top 34 of the finger 4 profile 20, a lever effect occurs on the finger 4 which causes the pivoting of this finger 4 and the concomitant displacement of the pin 10 which, in abutment against one end of the oblong hole 12 formed in the thickness of the twenty-four-hour wheel 2, will displace to abut against the opposite end of this oblong hole 12. Then, the first lever 16 begins to slide again along a second part 20b of the finger 4 profile 20 which is located after the top 34 of this profile 20. It will be noted that at the very moment when the first lever 16 causes the advance of the starwheel 24 by one pitch, the jumper 26 switches, against the return force of the lower spring 30, from a groove between two consecutive teeth of the toothing 28 of the starwheel 24 to the immediately following groove of this toothing 28. By falling into the following groove, the jumper 26 allows the starwheel 24 to complete its one-pitch advance and once again ensures the precise positioning of this starwheel 24.

According to a preferred but non-limiting embodiment of the moon phase display mechanism, the latter also comprises a manual device for correcting the moon phase display. Referred to as a whole by the general reference numeral 38, this manual correction device comprises a second lever 40 pivoted about an axis 42 and which comprises an actuating means 44 such as a pin at an end opposite to the pivot axis 42. This second lever 40 comprises for example a folded area 46 against which rests a corrector (not visible in the drawing) when the latter is actuated against the elastic return force of a spring by the owner of the wristwatch from outside the volume of the watch case. Under the effect of actuation of the corrector, the second lever 40 pivots about its axis 42 and in turn controls the pivoting of the first lever 16 so as to cause the starwheel 24 to advance by one pitch. This advance of the starwheel 24 takes place under the same conditions as those described above when the first lever exceeds the top 34 of the finger 4 profile 20.

According to a preferred embodiment given for only a purely illustrative and non-limiting purpose, a complete revolution of the starwheel 24 corresponds to two successive lunar cycles, a lunar cycle corresponding to the time which elapses between two new successive moons and which is also called lunar month. To this end, the moon phase display mechanism is completed by a first pinion 50 mounted coaxially and fixed in rotation on the starwheel 24, by a setting-wheel 56 as well as by a cam 52 on the axis of rotation of which a second pinion 54 is fixedly mounted. The first pinion 50 drives the second pinion 54 via the setting-wheel 56, the toothing ratios of this kinematic chain being calculated so that the cam 52 performs one complete revolution per lunar cycle.

Figure 4A:
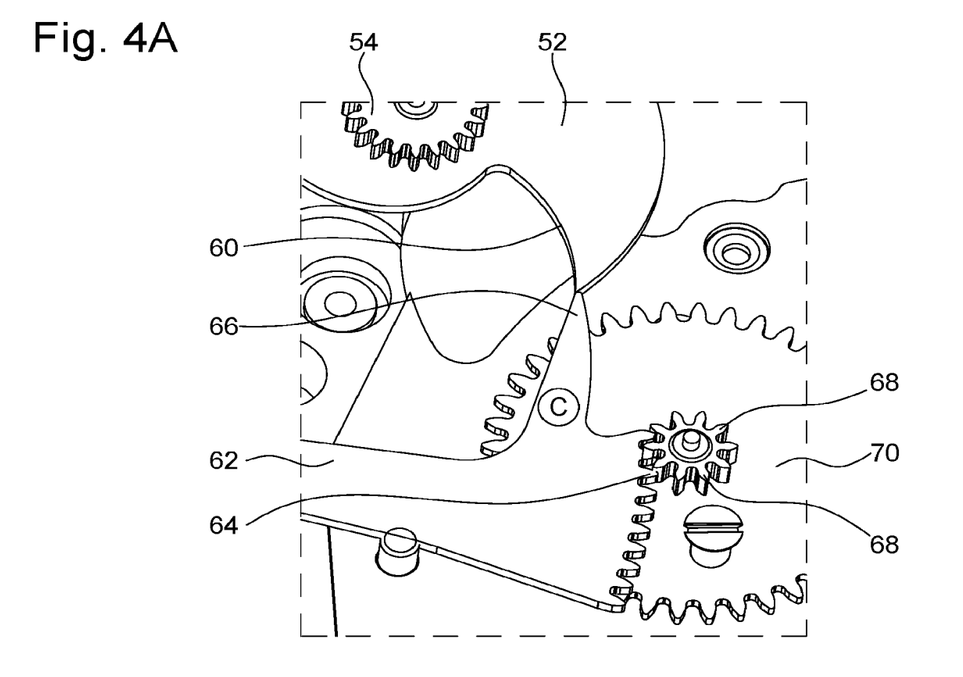
FIG. 4A is a detail view on a larger scale of the first rack in its position C wherein its feeler beak is at the top of the cam profile.
Figure 4B:
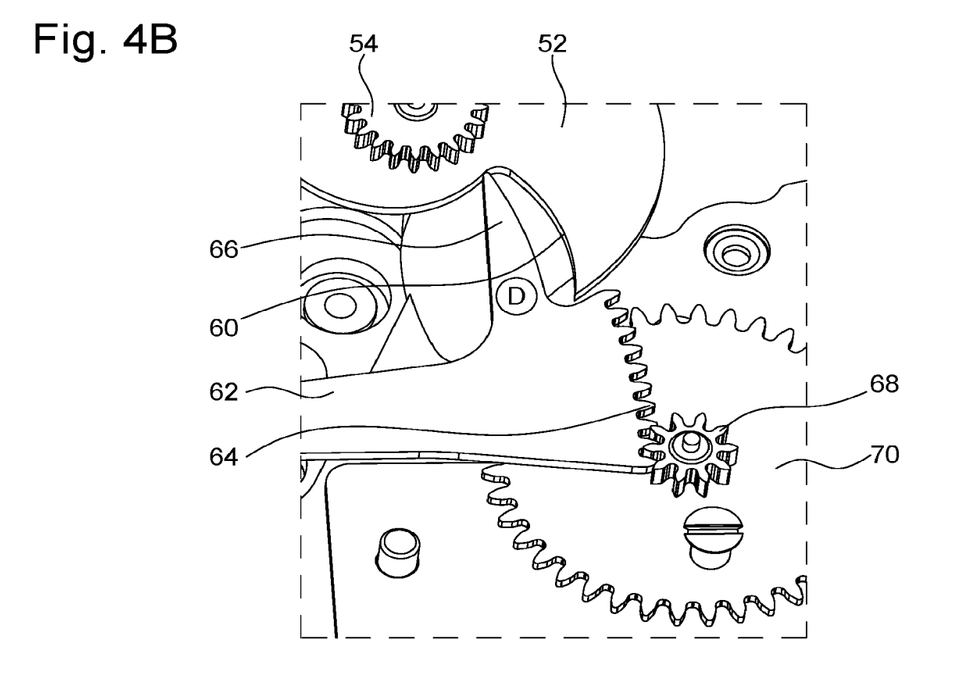
FIG. 4B is a detail view on a larger scale of the first rack in its position D wherein its feeler beak falls along the step of the cam.

The cam 52 has a snail-like profile 58 provided with a substantially rectilinear step 60. A first rack 62 provided with a toothed sector 64 is also provided with a feeler beak 66 by which it permanently follows the cam 52 profile 58. Shortly before the start of a new lunar cycle, for example at around midnight, the feeler beak 66 of the first rack 62 is at the top of the cam 52 profile 58 (position C—FIG. 4A), then falls along the step 60 of the cam 52 (position D—FIG. 4B). During this movement, the first rack 62 which, by its toothed sector 64, is in permanent engagement with a third pinion 68, rotates this third pinion 68 in the clockwise direction by an amount corresponding to the drop of the feeler beak 66 along the step 60.

By rotating, the third pinion 68 rotates a wheel 70 with which it forms a mobile 69. In other words, the third pinion 68 is mounted on the wheel 70 in a coaxial manner and fixed in rotation relative to this wheel 70. Consequently, the wheel 70 transmits its rotational movement to drive means 72 of the moon phase display mechanism 1 which comprise a lower wheel 74 and an upper wheel 78 mounted free in rotation on an axis of rotation 76. The lower wheel 74 meshes with a rectilinear rack 80 which in turn meshes with the upper wheel 78.

Figure 8A:
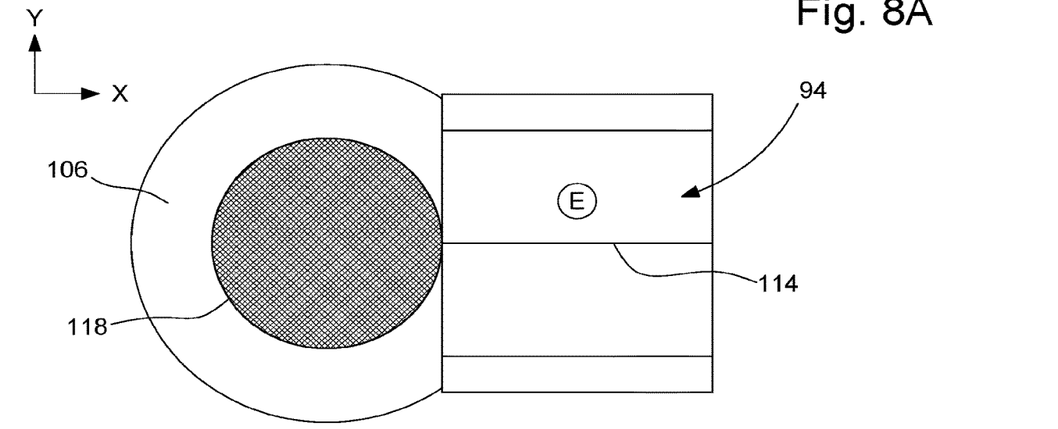
FIG. 8A is a schematic view of the moon phase display mechanism when it is in its extreme position E at the start of a lunar cycle.
Figure 8B:
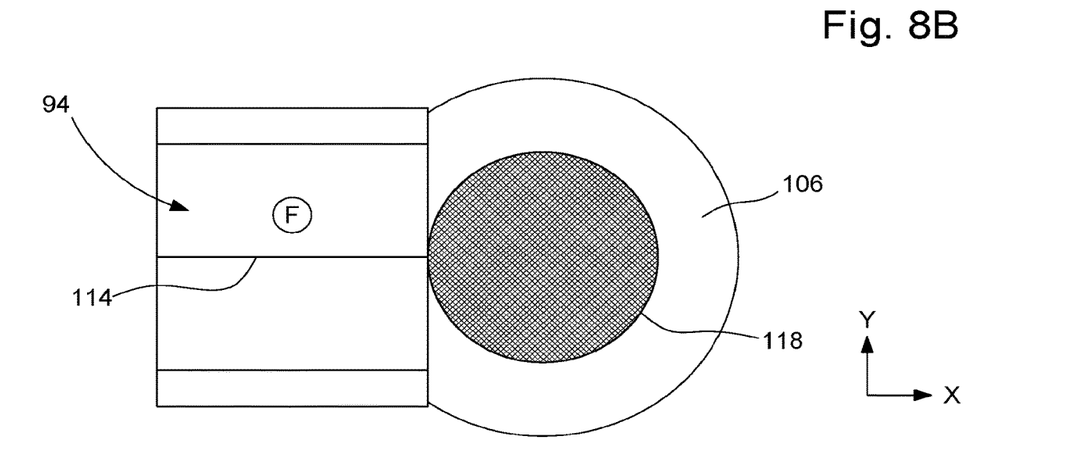
FIG. 8B is a view similar to that of FIG. 8A which illustrates the moon phase display mechanism when it is in its extreme position F at the end of the lunar cycle.

The lower wheel 74 is responsible for controlling the moon phase display mechanism 1. To this end, by pivoting, the lower wheel 74 drives the rectilinear rack 80 in translation and pushes it back into a first extreme position E illustrated in FIG. 8A which corresponds to the start of a new lunar cycle. Subsequently, when, after having fallen along the step 60 of the cam 52 at the start of the lunar cycle, the feeler beak 66 begins again to follow the cam 52 profile 58, the feeler beak 66 is gradually pushed back in the clockwise direction to a second extreme position F (see FIG. 8B), so that the third pinion 68, and therefore the wheel 70, rotate in the counter-clockwise direction. Consequently, the lower wheel 74 rotates in the clockwise direction and drives the rectilinear rack 80 in translation from the right to the left of the drawing from its first extreme position E which corresponds to the start of a new lunar cycle to its second extreme position F illustrated in FIG. 8B which corresponds to the end of the lunar cycle. Once the feeler beak 66 has travelled the entire length of the cam 52 profile 58, it will again find itself at the top of the step 60 of the cam 52 and, at the start of a new lunar cycle, the feeler beak 66 will fall along the step 60, which will cause the return of the rectilinear rack 80 in its initial position.

The moon phase display mechanism is supplemented by a device that allows to take-up clearances and return this moon phase display mechanism to its extreme position E at the end of a lunar cycle. This device consists of the upper wheel 78 engaged, on the one hand, with the toothing of the rectilinear rack 80, and on the other hand, with an intermediate wheel 82 of an intermediate mobile 84 which also comprises an intermediate pinion 86. This intermediate pinion 86 meshes with a toothed sector 88 of a second rack 90 which is elastically constrained by the return force of a fourth spring 92. Thanks to this arrangement, all the plays of the kinematic chain which extends between the first rack 62 and the second rack 90, are taken up so that the positioning of the rectilinear rack 80 is always precise.

The moon phase display mechanism 1 comprises the rectilinear rack 80 with which a shutter 94 is fixedly coupled in translation. The moon phase display mechanism 1 also comprises, on the side of an observer 96, a transparent support 98 provided with an upper face 100 which extends parallel to and at a distance from a lower face 102. A representation 104 of the Moon, for example in the form of a decal, is transferred to the upper face 100 of the transparent support 98. This representation 104 of the Moon could also be transferred to the lower face 102 of the transparent support 98. A substrate 106 is, relative to the observer 96, disposed under the transparent support 98, at a distance from the latter. The shutter 94 is mounted on the rectilinear rack 80 so as to be able to gradually penetrate into the space which separates the transparent support 98 from the substrate 106 when the rectilinear rack 80 is driven by the lower wheel 74.

The shutter 94 and the substrate 106 have inverted contrasts: either the shutter 94 is bright and the substrate 106 as well as the representation 104 of the Moon are dark, or the shutter 94 is dark and the substrate 106 as well as the representation 104 of the Moon are bright. Assuming, only by way of example, that the representation 104 of the Moon and the substrate 106 are dark and that the shutter 94 is bright and reflective, it is understood that when the shutter 94 is not in the space located between the transparent support 98 and the dark substrate 106, the representation 104 of the Moon is located above the dark substrate 106 and is therefore not perceptible by the observer 96. Then, as the bright and reflective shutter 94 penetrates into the space which separates the transparent support 98 from the dark substrate 106, the representation 104 of the Moon gradually becomes perceptible by the user. More specifically, as the shutter 94 begins to penetrate into the space between the transparent support 98 and the dark substrate 106, the observer 96 gradually sees the first quarter moon appear. Then, when the reflective shutter 94 is completely between the transparent support 98 and the dark substrate 106, the observer 96 sees the complete representation 104 of the Moon: it is the full moon. Then, the shutter 94 continues its rectilinear movement in the same direction and begins to leave the space between the transparent support 98 and the dark substrate 106, so that the observer 96 gradually sees the last quarter of the moon appear, a situation which corresponds to the moment when the shutter 94 leaves the same free surface as hidden surface. Finally, when the shutter 94 is completely out of the space between the transparent support 98 and the dark substrate 106, the observer 96 no longer sees the representation 104 of the Moon again (on the assumption that the substrate 106 has the same colour as the representation 104 of the Moon) and therefore knows that the lunar cycle has ended and that a new lunar cycle will begin. Thus, the observer 96 has an easily understandable representation of the various phases of the moon: new moon, first quarter moon, full moon, last quarter moon and then again new moon.

Figure 6:
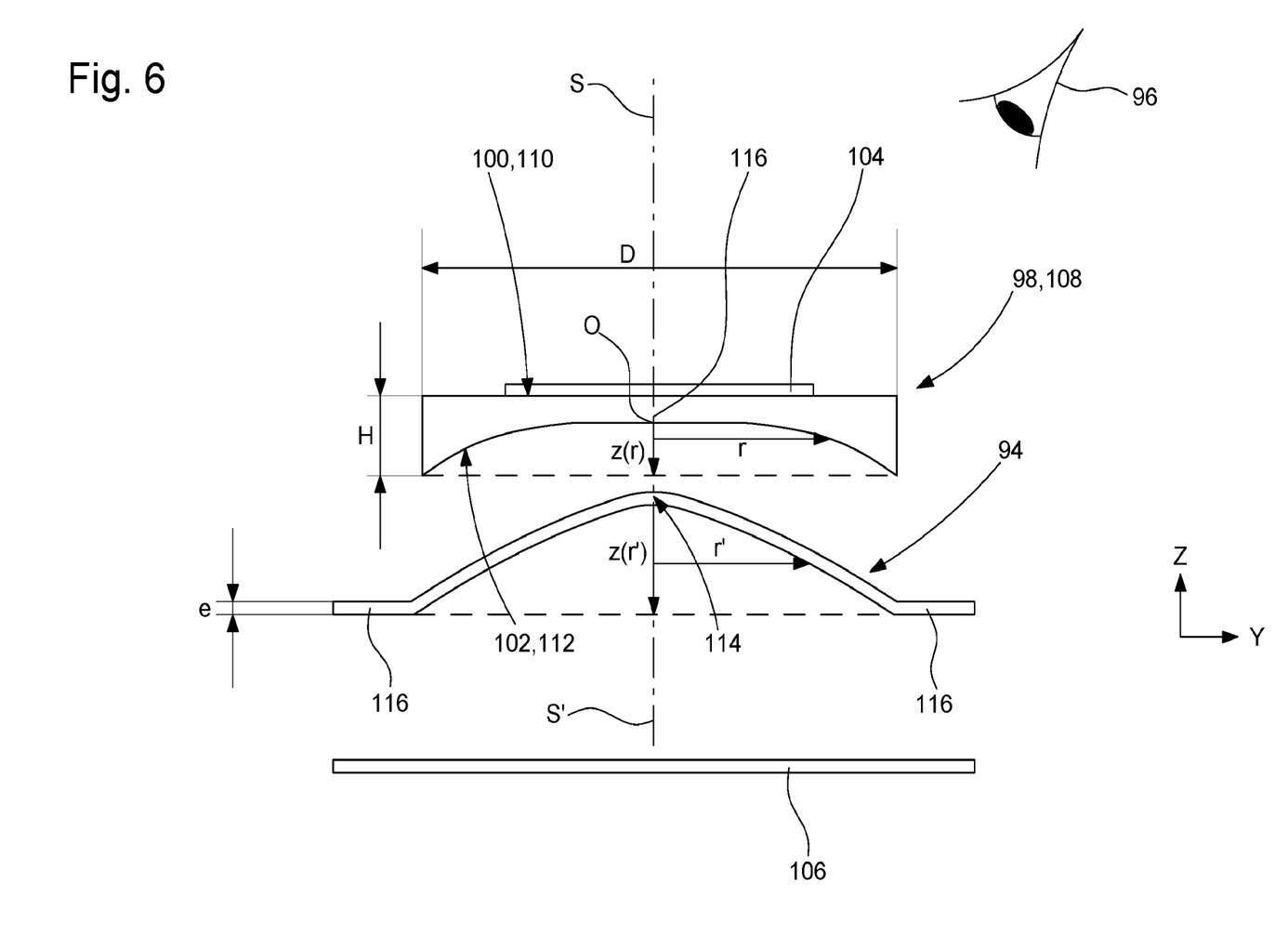
FIG. 6 is an elevational and sectional view of the optical assembly formed by the aspherical plano-concave lens, the shutter and the substrate.
Figure 7:
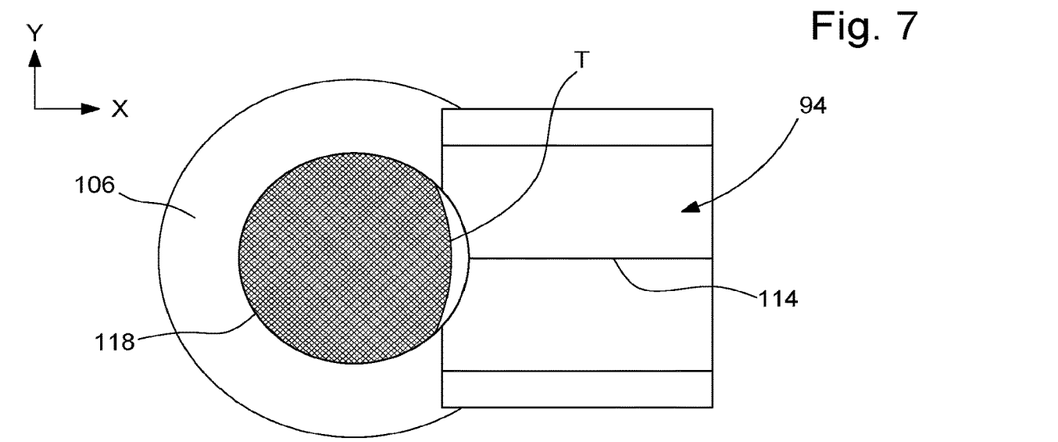
FIG. 7 is a schematic top view which illustrates the aspect of the representation of the Moon as it can be perceived by the observer when the shutter begins to penetrate into the space which separates the aspherical plano-concave lens from the substrate.

According to the invention, the transparent support 98 is in the form of a lens 108 of plano-concave shape delimited upwardly, on the side of the observer 96, by a planar surface 110 which receives the representation 104 of the Moon, and delimited downwardly by a concave surface 112 to which a preferably aspherical profile is given. This aspherical plano-concave lens 108 is combined with a shutter 94 folded in its centre to give it a curved profile, preferably but not necessarily a hyperbolic profile. An image of the Moon whose terminator, that is to say the curve which separates the dark part from the illuminated part of the Moon, best approximates the real aspect of the Moon in the sky is thus obtained.

To determine the geometric dimensions of the aspherical plano-concave lens 108 and of the hyperbolic profile shutter 94, use is made of computer-aided optical system design software such as that marketed under the brand LightTools, whose version 8 which has been published in 2019 was used for the purposes of the present invention.

Once the dimensions of the representation 104 of the Moon which it is desired to be able to display by means of the optical device according to the invention have been defined, the main parameters on which it is possible to act in order to obtain a realistic representation of the phases of the Moon are:

- the material from which the aspherical plano-concave lens 108 will be made and therefore the refractive index of the latter;
- the profile of the aspherical concave surface 112 of the aspherical
- plano-concave lens 108 and therefore its conic constant;
- the dimensions of the shutter 94;
- the distance which separates the top of the arch formed by the
- aspherical concave surface 112 and the shutter 94;
- the curved, preferably hyperbolic, profile of the shutter 94 and
- therefore its conic constant.

Only by way of a preferred example, the aspherical plano-concave lens 108 is made of a transparent material whose refractive index is preferably comprised between 1.60 and 1.85, with an optimum value in the vicinity of 1.78. This value was selected after numerous tests which allowed to observe that, the higher the value of the refractive index of the material from which the lens is made, the closer the lens had to be brought to the shutter 94 so that the latter is not visible to the observer through this lens. It is easily understood that this is favourable from the point of view of space requirement in the case where it is desired to integrate an optical device in accordance with the present invention into a timepiece of the wristwatch type. On the other hand, the higher the refractive index, the more expensive and difficult the corresponding material is to be machined. Furthermore, it has been realised that when the lens gets too close to the shutter 94, one ends up seeing the image of the peripheral edge of the lens which forms a lactescent opaline crown around the representation 104 of the Moon, which is not acceptable. Likewise, it was found that by selecting too low refractive index values, the image of the shutter 94 with a curved and preferably hyperbolic profile which gradually covered the representation of the Moon was not very aesthetic, nor really realistic compared to the true representation of the Moon. This is why a value of the order of 1.60 to 1.85 and preferably equal to or substantially equal to 1.78 for the optical refractive index of the material from which the aspherical plano-concave lens 108 is made appeared to be an optimum allowing to provide the best compromise between the optical refractive index of the material from which the aspherical plano-concave lens 108 is made and the distance separating the aspherical concave surface 112 of the aspherical plano-concave lens 108 and the shutter 94, and thus obtain a moon phase display mechanism whose space requirement is compatible with the dimensions of the timepiece wherein this mechanism is intended to be housed while providing a terminator whose profile is suitable. An example of a material which is well suited for the purposes of the present invention is the glass produced and marketed by Schott under the reference N-SF 11.

The dimensions of a block of transparent or at the very least translucent material such as a glass cylinder or polymer cylinder such as polycarbonate from which the aspherical plano-concave lens 108 is obtained are then introduced into the computer-aided design software. In the present case, the aspherical plano-concave lens 108 is obtained by machining a cylindrical glass block whose diameter D is comprised between 6 mm and 7 mm and whose height H is comprised between 0.9 mm and 1.1 mm (see FIGS. 5 and 6).

Figure 5:
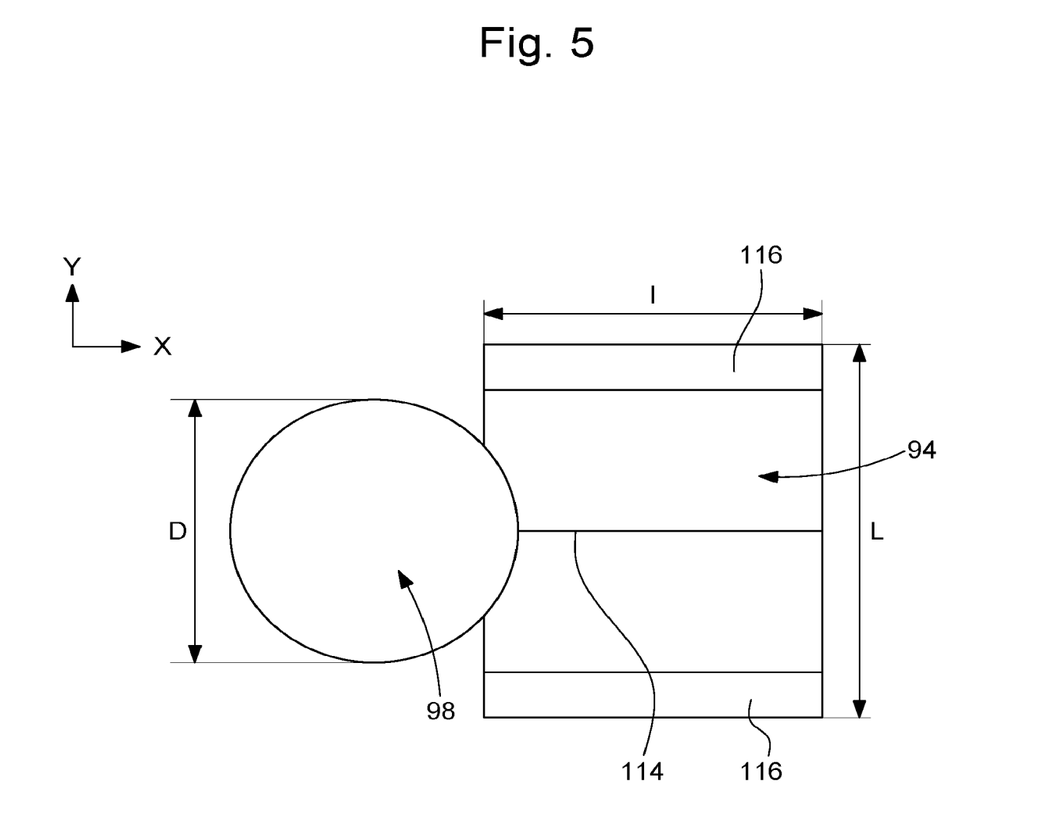
FIG. 5 is a top view of the transparent support and the sheet metal from which the aspherical plano-concave lens and the shutter are obtained.

As regards the hyperbolic profile shutter 94, this is obtained from a rectangular sheet metal whose thickness e is preferably but not exclusively comprised between 0.08 mm and 0.2 mm, and whose length l of the side which extends parallel to the direction of displacement of the shutter 94 is selected to be comprised between 7 mm and 8 mm, while the width L of the side which extends perpendicular to the direction of displacement of this shutter 94 is selected to be comprised between 9 mm and 10 mm. This sheet metal is provided at its centre with a fold 114 which extends in a direction parallel to the direction of displacement of the shutter 94 and preferably has flat edges 116 parallel to the fold 114. It will indeed be noted that it is not necessary for the shutter 94 to maintain its hyperbolic profile to its ends because, in these areas, the optical distortion effect is produced essentially by the aspherical plano-concave lens 108. These flat edges 116 therefore only have the function of completely obstructing the field of vision provided by the aspherical plano-concave lens 108 and, due to their flatness, these edges 116 allow to reduce the space requirement of the moon phase display mechanism.

The profile of the aspherical concave surface 112 of the aspherical plano-concave lens 108 is determined by the values of the distances r and z(r). If the central axis of symmetry of the aspherical plano-concave lens 108 is called S, the distance r corresponds to the distance which separates each point of the central axis of symmetry S from the point of the aspherical concave surface 112 which is located opposite thereto (see FIG. 6). Likewise, the hyperbolic profile of the shutter 94 is determined by the distance r' which separates each point of the plane of symmetry S' of this shutter 94 from the surface of the latter. These distances r, r' are determined by means of the same relation below:

$$z(r) = \frac{\frac{r^2}{R}}{1+\sqrt{1-(1+k)\frac{r^2}{R^2}}} + \sum_{n=1}^{N} A_n \cdot r^n$$

Where $k=-e^2$

As visible in FIG. 6, the origin of the function z(r) corresponds to the point O which is located at the top of the arch formed by the aspherical concave surface 112. The value of the function z(r) corresponds, in each point of the arch formed by the aspherical concave surface 112, to the height of this point considered from the base of the aspherical plano-concave lens 108.

The values of the constants R and k which characterise the aspherical plano-concave lens 108, as well as those of the constants R' and k' which characterise the shutter 94 will be determined by successive iterations in the manner described below. As for the coefficients $A_n$, they are coefficients of a polynomial sum the values of which will also be determined by iterations.

As for the aspherical plano-concave lens 108, the constant R corresponds to the radius of curvature of the aspherical concave surface 112 at the point O which is located at the top of the arch formed by this aspherical concave surface 112. So that the terminator T which is the dividing line between the dark part and the illuminated part of the Moon appears rectilinear in the middle of the lunar cycle, it is necessary that in the vicinity of the point O the aspherical concave surface 112 is practically planar. To this end, a very large radius of curvature R value, of the order of several thousands of millimetres, is initially introduced into the computer-aided design software. As for the constant "k" which is called "conic constant", it is a quantity which describes the conical sections. Conical section means a plane curve defined by the intersection of a cone of revolution with a plane. When the section plane does not pass through the top of the cone, its intersection with this cone corresponds to one of the following plane curves: ellipse, parabola or hyperbola.

Note that $k=-e^2$ with e corresponding to the eccentricity of the conical section. The eccentricity of a conical section is a positive real number which characterises only the shape of this conical section; the eccentricity of a conical section can be interpreted as a measure of the amount by which a conical section deviates from a circle. Thus, the eccentricity of a circle is zero. The eccentricity of an ellipse that is not a circle is strictly comprised between zero and one. The eccentricity of a parabola is equal to 1 and the eccentricity of a hyperbola is greater than 1.

The conical constant k is involved in the equation $$y^2 - 2Rx + (k+1)x^2 = 0$$

which describes a conical section whose apex is at the origin and whose tangent extends along the "y" axis and where R is the radius of curvature for x=0. This formula is used in geometric optics to describe the optical surface of a lens. In this case, it was initially indicated to the computer-aided design software that the conic constant was zero (k=0), in other words, one was dealing with a circle.

Consequently, as regards the aspherical plano-concave lens 108, the simulation is started with a zero value of the conical constant k and a very large value of the radius of curvature R.

The same is true as regards the shutter 94 for which the simulation is started with a zero value of the conical constant k' and a very large value of the radius of curvature R'. It is important to note that the shutter 94 can be considered as the object whose image is perceived through the aspherical plano-concave lens 108 and, as such, its geometric features can be determined by a computer-aided optical system design software such as LightTools.

Finally, it is considered that the aspherical plano-concave lens 108 is of even order, so that one starts by arbitrarily selecting values for the coefficients $A_4$, $A_6$ and $A_8$. In the initial choice of the values of the coefficients $A_4$, $A_6$ and $A_8$, a person skilled in the art is guided by the fact that he knows that the values of these coefficients are very low and that they keep decreasing as the index n increases. However, decision is made to stop at the coefficient $A_8$ because the contribution of the higher order coefficients on the improvement of the aspect resulting from the terminator T is negligible. Regarding the coefficient $A_2$, this is ignored because the first term of the expression z(r) already contains the square of the variable r.

Figure 9A:
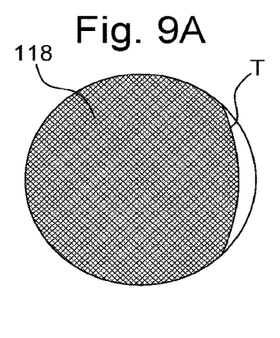
FIGS. 9A to 9L illustrate the aspect of the terminator in several positions of the curved, preferably hyperbolic profile shutter.
Figure 9B:
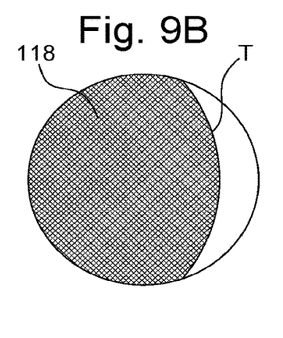
Figure 9C:
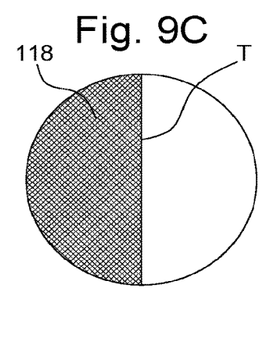
Figure 9D:
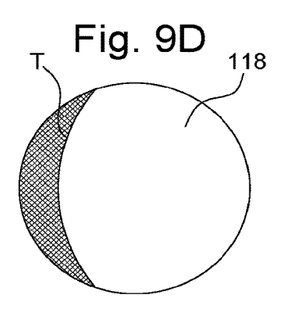
Figure 9E:
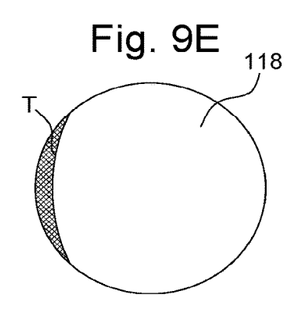
Figure 9F:
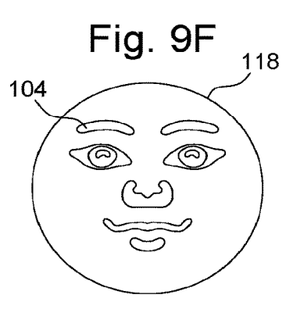
Figure 9G:
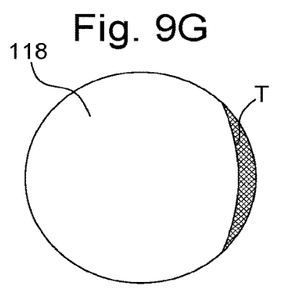
Figure 9H:
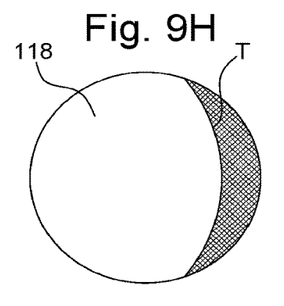
Figure 9I:
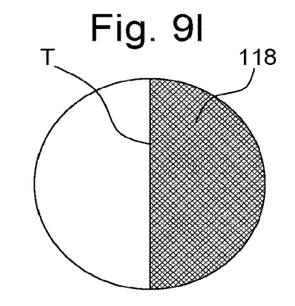
Figure 9J:
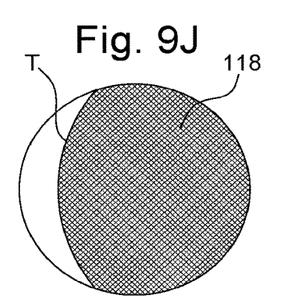
Figure 9K:
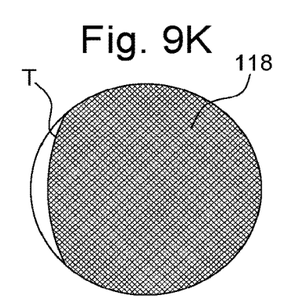
Figure 9L:
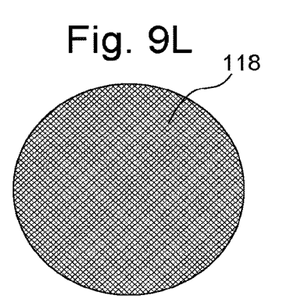

Using the computer-aided design software, a representation 118 of the Moon and its terminator T is simulated for several shutter positions 94 (see FIGS. 7 and 9A to 9L). In FIG. 9A, it is the start of a lunar cycle. In FIG. 9C, the Moon is in its first quarter. In FIG. 9F, it is the middle of the lunar cycle and the Moon is full. FIG. 9I corresponds to the last quarter of the Moon and in FIG. 9L, it is the new Moon. To carry out the simulations, one begins, for example, to vary the values of the parameters $A_n$ as well as of the conical constant k and of the radius of curvature R which characterise the aspherical plano-concave lens 108, while keeping the values of the parameters $A_n'$, as well as of the conical constant k' and of the radius of curvature R' which characterise the shutter 94 unchanged, and observes on the computer screen the aspect resulting from the terminator T. The experiment is repeated, this time keeping constant the values of the parameters $A_n$, k and R which characterise the aspherical plano-concave lens 108, and varying the values of the parameters $A'_n$, as well as of k' and R' which characterise the shutter 94, and the aspect resulting from the terminator T is observed on the computer screen by means of the "Photorealistic Rendering" function of the LighTools software. This function allows to view the entire device formed by the aspherical plano-concave lens, the hyperbolic shutter and the substrate as if this device was photographed at the desired angles and distances. Thanks to the "Photorealistic Rendering" function, it is thus possible to verify that the desired optical effect is suitable. Thus, one proceeds step by step until obtaining a profile of the terminator T that is considered faithful to its real aspect and which is satisfactory. Of course, this is a purely subjective criterion which is left to the discretion of each individual.

It will be noted that for the dimensional features of the aspherical plano-concave lens 108 and of the shutter 94 mentioned above, the most satisfactory results as regards the visual aspect of the terminator T were obtained for the values $k=-1$ and $R=20840$ mm and $A_4=3.769.10^{-3}$, $A_6=2.9534.10^{-5}$ and $A_6=-1.407.10^{-7}$ as regards the aspherical plano-concave lens 108, and for the values $k'=-4.922$ and $R'=2.556$ mm and $A_4=1.654.10^{-5}$, $A_6=-1.511.10^6$ and $A_8=4.686.10^{-8}$ as regards the shutter 94. It will be observed that as regards the value of the conic constant k, the value retained for the aspherical plano-concave lens 108 is equal to −1, which corresponds to a parabolic profile. As for the value of the conic constant k' which characterises the profile of the shutter 98, it is less than −1, which corresponds to a hyperbolic profile.

Thus, the point O which is located at the top of the arch formed by the aspherical concave surface 112 is located at a distance P equal to 0.78 mm relative to the base of the cylindrical glass block. Consequently, it is deduced that at this point O, the thickness of the aspherical plano-concave lens 108 is 0.22 mm. This is the minimum thickness of the aspherical plano-concave lens 108.

It goes without saying that the present invention is not limited to the embodiment which has just been described and that various simple modifications and variants can be considered by a person skilled in the art without departing from the scope of the invention as defined by the appended claims. It should be noted in particular that, in the case where the shutter is bright, it can be covered with a layer of phosphorescent material such as that marketed under the registered trademark Super-LumiNova®. It should also be noted that in order to avoid light reflection phenomena, the surface of the shutter can advantageously have roughness. Always with the same concern to limit light reflections as much as possible, the plano-concave lens can be the subject of an anti-reflective treatment and its edges can be metallised. Although not shown in the drawing, it will be noted that provision may be made to provide the cam 52 with two steps 60. Given that the starwheel 24 makes a complete revolution in two lunar cycles, it is then possible to directly engage the starwheel 24 with the cam 52, and thus to save the pinions 50 and 54 and the setting-wheel 56.

NOMENCLATURE

1. Moon phase display mechanism
2. Twenty-four-hour wheel

4. Finger
6. Axis
8. Ring
10. Pin
12. Oblong hole
14. Inner wall
16. First lever
18. Pivot axis
20. Profile
22. Upper spring
24. Starwheel
26. Jumper
28. Toothing
30. Lower spring
32. Foot
34. Top
36. Beak
38. Manual correction device
40. Second lever
42. Pivot axis
44. Actuating means
46. Folded area
50. First pinion
52. Cam
54. Second pinion
56. Setting-wheel
58. Profile
60. Step
62. First rack
64. Toothed sector
66. Feeler beak
68. Third pinion
69. Mobile
70. Wheel
72. Drive means
74. Lower wheel
76. Axis of rotation
78. Upper wheel
80. Rectilinear rack
82. Intermediate wheel
84. Intermediate mobile
86. Intermediate pinion
88. Toothed sector
90. Second rack
92. Fourth spring
94. Shutter
96. Observer
98. Transparent support
100. Upper face
102. Lower face
104. Representation of the Moon
106. Substrate
108. Aspherical plano-concave lens
110. Planar surface
112. Aspherical concave surface
114. Fold
116. Flat edges
118. Representation of the Moon

The invention claimed is:

1. An optical device comprising a transparent support provided with an upper face and a lower face which extends at a distance from the upper face, said transparent support forming a lens of plano-concave shape delimited on a first side by a planar surface, and delimited on a second side, opposite the first side, by a concave surface, the optical device also comprising a shutter which is disposed under the concave surface of the transparent support, at a distance therefrom, the shutter being configured to be displaced from an initial position to a final position by a horological movement, the optical device finally comprising a substrate disposed below the shutter, the optical device being arranged to form, through the plano-concave lens, the image of an edge of the shutter with the image of an object disposed above the planar surface of said plano-concave lens.

2. The optical device according to claim 1, wherein the optical refractive index of the material from which the plano-concave lens is made is comprised between 1.60 and 1.85.

3. The optical device according to claim 2, wherein the optical refractive index is equal to 1.78.

4. The optical device according to claim 2, wherein the plano-concave lens is made of glass or polymer.

5. The optical device according to claim 3, wherein the plano-concave lens is made of glass or polymer.

6. The optical device according to claim 1, wherein the concave surface is curved.

7. The optical device according to claim 2, wherein the concave surface is curved.

8. The optical device according to claim 6, wherein the concave surface has an aspherical profile.

9. The optical device according to claim 7, wherein the concave surface has an aspherical profile.

10. The optical device according to claim 1, wherein the shutter has a curved profile.

11. The optical device according to claim 2, wherein the shutter has a curved profile.

12. The optical device according to claim 6, wherein the shutter has a curved profile.

13. The optical device according to claim 7, wherein the shutter has a curved profile.

14. The optical device according to claim 8, wherein the shutter has a curved profile.

15. The optical device according to claim 9, wherein the shutter has a curved profile.

16. The optical device according to claim 10, wherein the shutter has a hyperbolic profile.

17. The optical device according to claim 11, wherein the shutter has a hyperbolic profile.

18. The optical device according to claim 12, wherein the shutter has a hyperbolic profile.

19. The optical device according to claim 13, wherein the shutter has a hyperbolic profile.

20. The optical device according to claim 14, wherein the shutter has a hyperbolic profile.

21. The optical device according to claim 15, wherein the shutter has a hyperbolic profile.

22. The optical device according to claim 1, wherein a representation of the Moon is transferred to one of the upper or lower faces of the transparent support, the optical device also comprising drive means which, intended to be moved by the horological movement, drive the shutter, the shutter and the substrate having display contrasts which are inverted relative to each other, the shutter being displaced from the initial position to the final position for a duration of a lunar cycle, so as to reveal day after day to an observer the aspect of the Moon which changes from the new moon to the first quarter moon, then from the first quarter moon to the full moon, then to the last quarter moon and finally to the new moon, the shutter being returned by the drive means from its final position to its initial position at the end of the lunar cycle.

23. The optical device according to claim 22, wherein the drive means comprise a rectilinear rack with which the shutter is fixedly coupled in translation.

24. The optical device according to claim 23, further comprising a clearance take-up device, an upper wheel of which comprises an axis of rotation on which a lower wheel of the drive means is mounted free in rotation, said lower wheel meshing with the rectilinear rack.

25. The optical device according to claim 23, wherein the horological movement comprises a motion-work mobile which kinematically drives a cam which performs a complete revolution on itself in an integer number of times a lunar cycle, said cam having a profile that is permanently followed by a first rack, said first rack being provided with a toothed sector by which it meshes with the drive means.

26. The optical device according to claim 24, wherein the horological movement comprises a motion-work mobile which kinematically drives a cam which performs a complete revolution on itself in an integer number of times a lunar cycle, said cam having a profile that is permanently followed by a first rack, said first rack being provided with a toothed sector by which it meshes with the drive means.

27. The optical device according to claim 25, wherein the first rack is provided with a feeler beak by which it permanently follows the cam profile, said profile being shaped as a snail and being provided with at least one substantially rectilinear step so that, shortly before the start of a new lunar cycle, the feeler beak is at the top of the cam profile, then falls along the step, the first rack driving during said movement by its toothed sector a pinion which is kinematically connected to the drive means.

28. The optical device according to claim 26, wherein the first rack is provided with a feeler beak by which the first rack permanently follows the cam profile, said profile being shaped as a snail and being provided with at least one substantially rectilinear step so that, shortly before the start of a new lunar cycle, the feeler beak is at the top of the cam profile, then falls along the step, the first rack driving during said movement by its toothed sector a pinion which is kinematically connected to the drive means.

29. The optical device according to claim 25, wherein the upper wheel is engaged, on the one hand, with the rectilinear rack, and on the other hand, with an intermediate wheel of an intermediate mobile which also comprises an intermediate pinion, said intermediate pinion meshing with a toothed sector of a second rack which is elastically constrained by the return force of a fourth spring.

30. The optical device according to claim 26, wherein the upper wheel is engaged, on the one hand, with the rectilinear rack, and on the other hand, with an intermediate wheel of an intermediate mobile which also comprises an intermediate pinion, said intermediate pinion meshing with a toothed sector of a second rack which is elastically constrained by the return force of a fourth spring.

31. The optical device according to claim 27, wherein the upper wheel is engaged, on the one hand, with the rectilinear rack, and on the other hand, with an intermediate wheel of an intermediate mobile which also comprises an intermediate pinion, said intermediate pinion meshing with a toothed sector of a second rack which is elastically constrained by the return force of a fourth spring.

32. The optical device according to claim 28, wherein the upper wheel is engaged, on the one hand, with the rectilinear rack, and on the other hand, with an intermediate wheel of an intermediate mobile which also comprises an intermediate pinion, said intermediate pinion meshing with a toothed sector of a second rack which is elastically constrained by the return force of a fourth spring.

\* \* \* \* \*